Sept. 26, 1967　　　A. J. BJERKAN　　　3,343,686
BOOM-TYPE IMPLEMENT

Filed March 9, 1966　　　　　　　　　　　4 Sheets-Sheet 1

*INVENTOR.*
ARTHUR J. BJERKAN

BY *William A. Murray*

ATTORNEY

Sept. 26, 1967          A. J. BJERKAN          3,343,686
BOOM-TYPE IMPLEMENT
Filed March 9, 1966          4 Sheets-Sheet 3
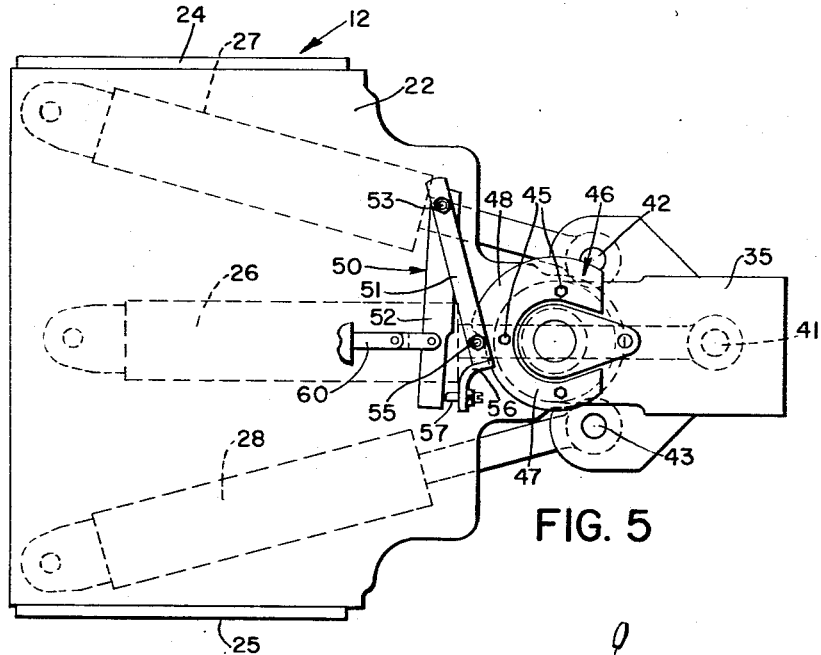
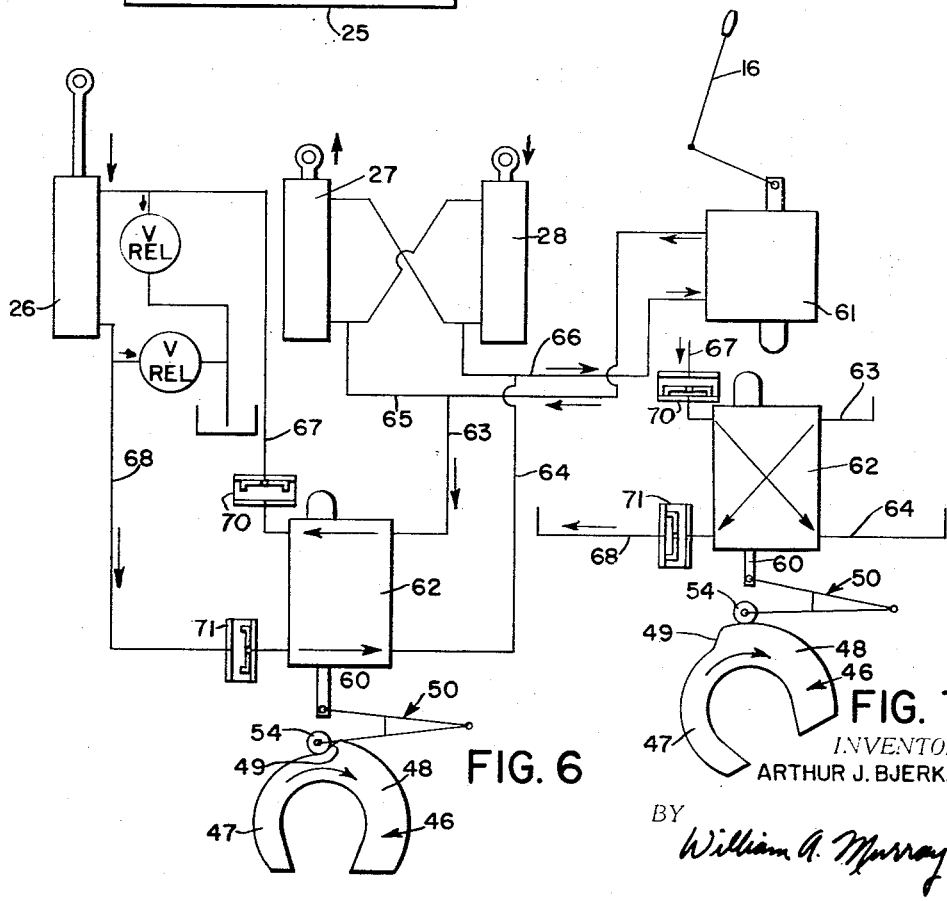
INVENTOR.
ARTHUR J. BJERKAN
BY William A. Murray
ATTORNEY

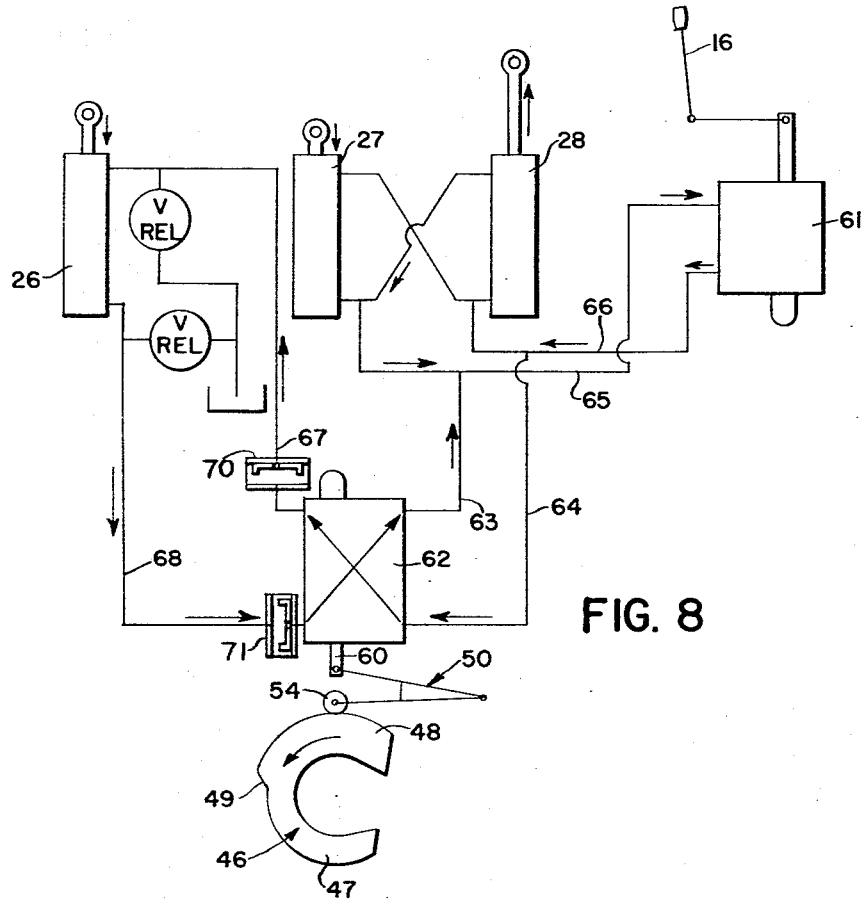

United States Patent Office 3,343,686
Patented Sept. 26, 1967

3,343,686
BOOM-TYPE IMPLEMENT
Arthur Jerome Bjerkan, Moline, Ill., assignor to Deere & Company, Moline, Ill., a corporation of Delaware
Filed Mar. 9, 1966, Ser. No. 533,080
12 Claims. (Cl. 212—66)

ABSTRACT OF THE DISCLOSURE

A boom-type implement having a main support and a boom support carried on the main support for movement about an upright axis; at least three angularly spaced extensible and retractable hydraulic units extending between the main support and boom support, and being connected to the latter at connections radially offset from the upright axis and whereby as the hydraulic units are extended and retracted they will swivel the boom support about the upright axis, and whereby the connections are so disposed that the effective lever arms between the respective connections and axis of two units will increase and decrease in unison and in reverse order to the effective lever arm between the other connection and the other unit.

---

This invention relates to a boom-type implement and more particularly to a boom-type implement that includes a fixed main support and a boom support swivelably mounted on the main support so as to permit the boom to swing about an upright axis. Still more particularly the invention relates to the power means for affecting the swiveling action of the boom support.

Heretofore in boom-type implements in which it is desired to swivel the boom about an upright axis, there has been utilized a pair of hydraulic cylinders that extends between the main support and the boom support and operates to swing the boom about its upright axis. The hydraulic cylinders have been connected to the boom support on opposite transverse sides of the upright swivel so that as one hydraulic cylinder is retracting for movement of the boom, the other hydraulic cylinder is extending. The problem with such a type of structure for swiveling the boom occurs due to the fact that as the hydraulic cylinders are extended or retracted, they approach the location of passing substantially in alignment with the upright axis. Consequently the effective lever arm between the upright axis and the end of the hydraulic cylinder is reduced to thereby considerably reduce the efficiency and operation of the hydraulic cylinders. Also, there is a considerable fluctuation in the rate of speed in which the boom support will swivel due to the varying effective sizes of the lever arms connected to the cylinders.

With the above in mind, it is the primary object of the present invention to incorporate in a boom structure of the above type, a series of hydraulic cylinders that will move to swing the boom structure about the upright axis. The cylinders are so positioned and connected to the boom structure that as part of the cylinders moves to a position in which the effective lever arm approaches the minimum, the others of the hydraulic cylinders are approaching a position where the effective lever arms are at their maximum. The hydraulic cylinders are interconnected in a parallel fluid flow operation so that the requirement for hydraulic fluid within the cylinders is always received in the amount required.

Specifically, it is the object of the present invention to provide a pair of hydraulic cylinders that extends from the main support to the boom support. The hydraulic cylinders are connected to the boom support on opposite sides of the upright axis. A third hydraulic cylinder extends from the main support to the boom support and is connected to the boom support at a location in fore-and-aft alignment with the upright axis when the boom is substantially fore and aft of the upright axis. Associated with this arrangement of hydraulic cylinders is a valve operating mechanism carried on the boom support that operates to reverse the flow of action in the center hydraulic unit as the boom structure passes beyond the fore-and-aft center line of the implement.

Other objects and advantages of the invention will become apparent to those skilled in the art as the nature of the invention is better understood from the following descriptions and as shown in the accompanying drawings.

FIG. 5 is a plan view of a portion of the support, the swivel, and a portion of the boom as taken substantially along the line 5—5 of FIG. 2.

FIG. 6 is a schematic view of the hydraulic system utilized in the invention.

FIG. 7 is a schematic view of a portion of the mechanism shown in FIG. 6 with a different flow of hydraulic fluid.

FIG. 8 is a view somewhat similar to FIG. 6 and showing the valve mechanism and the boom support in a different position.

Figure 1:
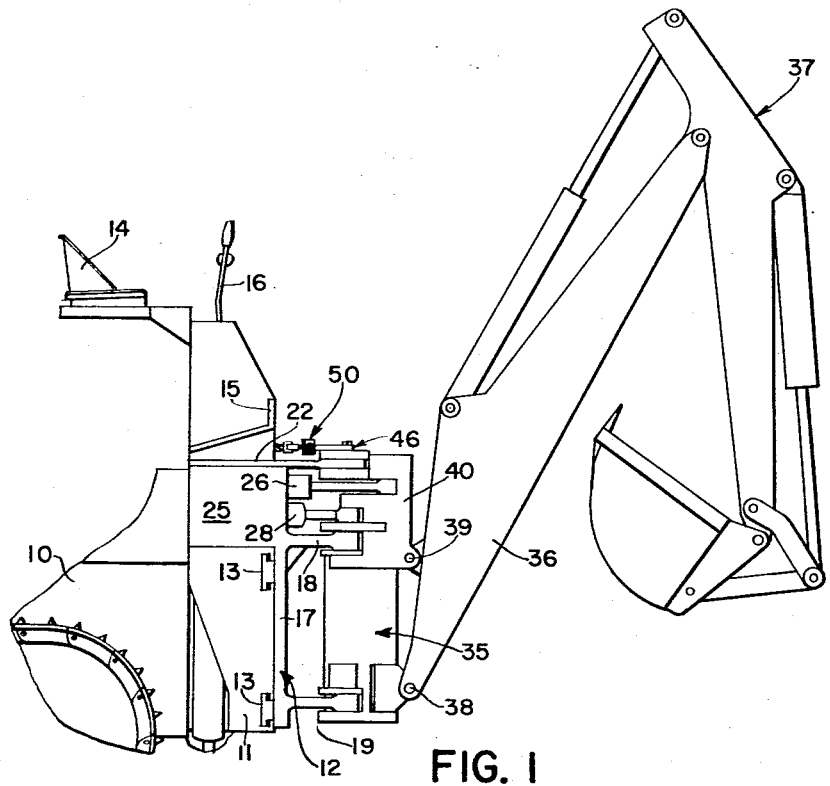
FIG. 1 is a side view of a rear portion of a tractor and a backhoe incorporating the principles of the present invention.
Figure 2:
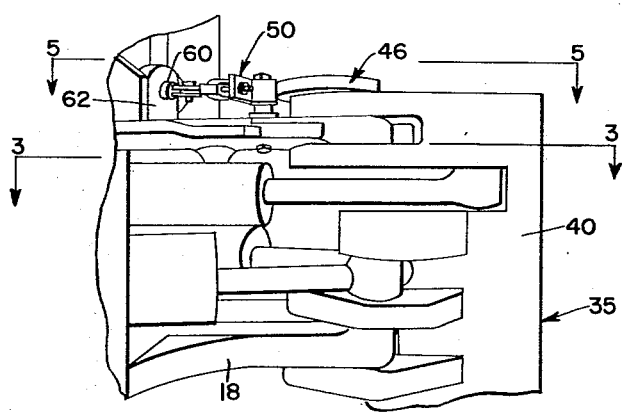
FIG. 2 is a side perspective view of a portion of the swivel structure between the backhoe support and the backhoe boom.

The boom-type implement, here in the form of a backhoe is normally supported on the rear of a tractor 10. The backhoe includes a main support composed of a first part 11 fixed to the tractor 10 and a second part 12 that is adapted to move transversely along the first part 11 by track and guide means 13. Details of the track and guide means are not important for purposes of fully appreciating the present invention other than to recognize that there is some advantage in the present invention in supporting the backhoe so that it will move transversely along the frame part 11. Should details of the track and guide means be desired, such may be had by reference to U.S. Patent 3,215,282 that issued Nov. 2, 1965, to Edward R. Wiemann and John A. Anderson. The part 12 has an upper section positioned over the main frame part 11 that includes an operator's station as indicated by the operator's seat 14, foot rest 15 and operating levers 16. The frame part 12 also includes a rigid upright structural plate 17 alongside and forwardly of the frame part 11. The upright structural plate 17 has a pair of forwardly projecting horizontal flanges 18, 19 having forward upright and aligned journals that receive an upright supporting shaft 20. The main frame part also includes an upper box-like structure having upper and lower plates 22, 23, the latter overlying the top surface of the frame part 11, that are interconnected by upright fore-and-aft extending end plates 24, 25. The box-like structure opens forwardly. Contained within the box-like structure is one hydraulic unit 26 that lies centrally between a pair of outer hydraulic units 27, 28. The hydraulic units 26–28 are of the piston cylinder type and are adapted to extend and retract. Supported on the vertical swivel shafts 20 is a boom support 35 for a boom 36 of a backhoe, indicated in its entirety by the reference numeral 37. The boom support 35 is provided with a lower transverse horizontal pivot 38 that carries the boom 36 for vertical movement and an upper transverse horizontal pivot 39 that carries a hydraulic cylinder that operates to raise and lower the boom 36. As is conventional, it is desirable to swing the boom 36 as well as the backhoe 37 between positions in fore-and-aft alignment with the tractor 10 to and from positions in transverse disposition to the tractor 10.

The support 35 is provided with an upper head 40 suitably notched to receive the rod ends of the hydraulic cylinders 26, 27 and 28. Pivotal connections in the form of upright pivot pins 41, 42 and 43 are positioned to receive the rod ends of the hydraulic units 26, 27 and 28 respectively. The pin 41 for the central cylinder 26 is located between the two outer pins 42, 43.

Figure 3:
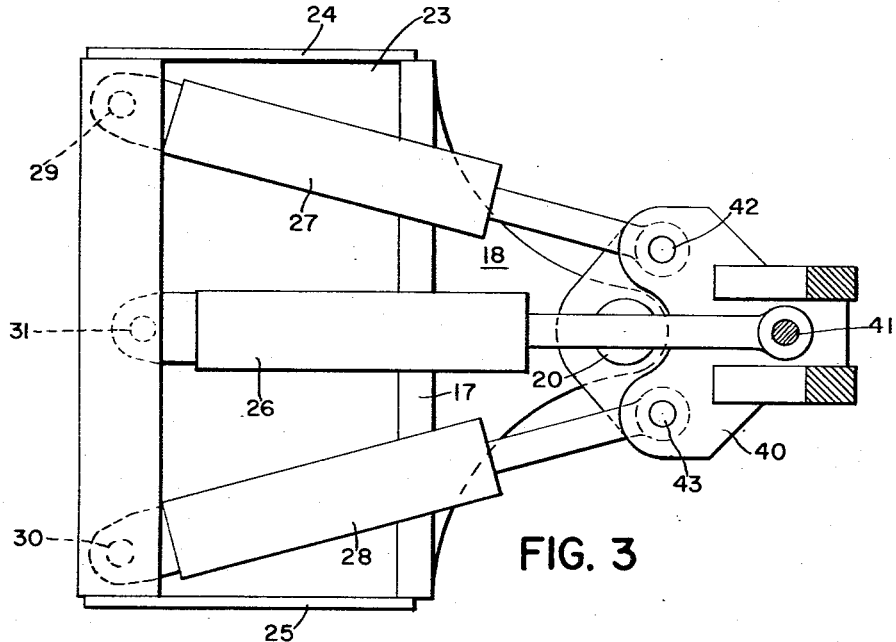
FIG. 3 is a sectional view taken substantially along the line 3—3 of FIG. 2.
Figure 4:
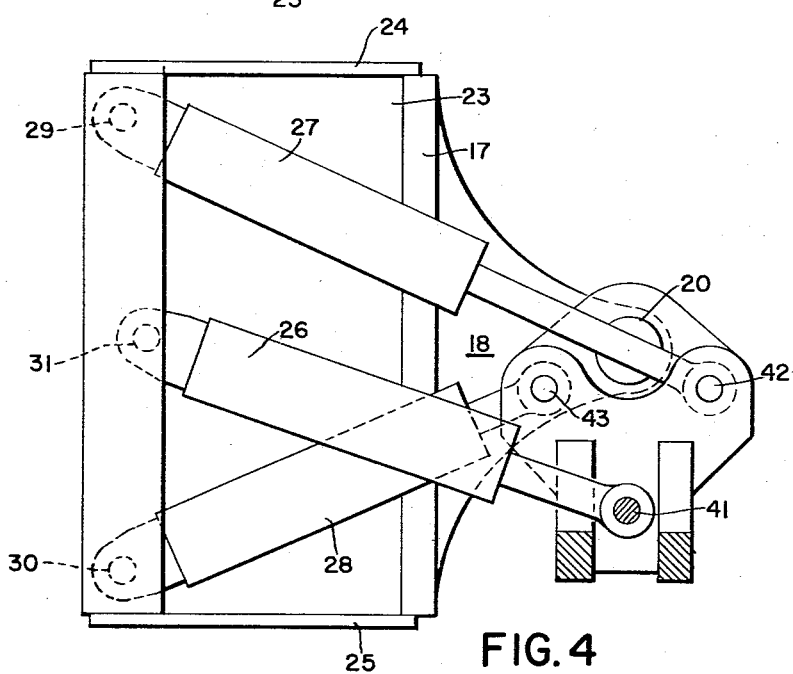
FIG. 4 is a view similar to FIG. 3 but showing the boom support in a different position.

When moving the boom 36 from a fore-and-aft position in relation to the tractor to a transversely extending position as shown in FIG. 4, the hydraulic unit 27 is extended and the hydraulic unit 28 is retracted. Also, the hydraulic unit 26 is retracted. Viewing FIG. 3 for the moment, it will be noted that the hydraulic unit 26 is axially aligned with the axis of the upright pin 20 and consequently there is no effective lever arm between the pin 41 and the pin 20. In this position the effective lever arms between the pin 20 and the pins 42, 43 are at their maximum. However, as the unit shifts to the right to a position as shown in FIG. 4, the effective lever arm between the pin 41 and the pin 20 increases until it is at its maximum when the boom is in the transverse extending position. At the same time the hydraulic units 27, 28 and their effective lever arms between the pins 42, 43 and 20 decrease until the units 27, 28 are substantially axially aligned with the upright axis of the pin 20. At this time there are no effective lever arms between the units 27, 28 and the axis of the pin 20. Consequently the effective lever arms between the pin 41 and pin 20 and the effective lever arms between the pins 42, 43 and the pin 20 increase and decrease in reverse order. The hydraulic units 26, 27 and 28 are supported on the frame part 11 by vertical pins 31, 29 and 30 respectively and consequently are capable of shifting laterally.

Bolted at 45 to the head 40 is a horizontal cam plate 46. The plate 46 has a low portion 47 and a high portion 48 joined by a ramp portion 49. Associated with the cam plate 46 is a valve control 50 composed of a pair of arms 51, 52. The arm 51 may be split to have a portion above and below the arm 52. The two arms are supported on the plate 22 by an upright pivot pin 53 that permits both arms to swing horizontally. The arm 51 carries on its outer end a cam follower 54 that engages the outer edges of the cam plate 46. The follower 54 is bolted at 55 to the arm 51. Welded to the extreme outer end of the arm is a bracket 56 having an adjusting bolt 57 extending therethrough and engaging one edge of the arm 52. The adjusting bolt 57 is for providing minute adjustments in determining the angle between the arms 51, 52. The arm 52 is connected to a valve stem 60 through operation of a link 61, such being obvious from viewing FIG. 5.

Reference is now made to FIGS. 6–8 for a schematic showing of the operation of the hydraulic systems. FIG. 6 shows the operation of the hydraulic system for moving the boom support 35 and the boom in a clockwise direction and shows the specific location of the various hydraulic units and valve mechanism at the precise time the boom support 35 and boom 36 have moved slightly to the right of a fore-and-aft center line of the tractor. In this position the valve control 16 is adjusted so that the main valve 61 moves fluid to the cylinder end of the left hydraulic cylinder 27 and to the rod end of the right hydraulic cylinder 28. This movement of fluid causes the boom control 35 to move in a clockwise direction. Fluid will also move to a valve control 62 through lines 63, 64 that are in communication with fluid lines 65, 66 extending respectively from the main valve 61 to the respective hydraulic cylinders 27, 28. At the specific location shown in FIG. 6, the ramp follower 54 has moved down the ramp 49 to engage the low side 47 of the cam plate 46. This adjusts the valve stem 60 so that fluid moves directly across the valve from the lines 63, 64 to lines 67, 68 that lead to the ram end and cylinder end respectively of the central hydraulic unit 26. Fluid moving to the ram end and being withdrawn from the cylinder end, as indicated in FIG. 6, causes the central unit to retract and to aid in the clockwise adjustment of the boom support 35.

FIG. 7 shows the position of the cam plate 46 as the main valve 61 moves the boom support 35 in a clockwise direction and prior to the time the boom support 35 reaches a direct fore-and-aft position in regard to the tractor. In this position the follower 54 is riding on the high side 48 of the cam plate 46 and is about to move downwardly on the ramp 49. The valve stem 60 is in a retracted position, as compared to the position shown in FIG. 6, and consequently there is a fluid connection between the lines 63 and 68 and between the lines 64 and 67. This causes the central hydraulic unit 26 to extend. At substantially the location in which the boom support 35 reaches a fore-and-aft position relative to the main supporting stand, the follower 54 will move down the ramp 49 and into the position shown in FIG. 6 so as to reverse the hydraulic unit 26 to a retracting operation. Consequently movement of the support 35 to opposite sides of a fore-and-aft center line in respect to the tractor automatically affects adjustment of the valve 62 to reverse the flow of fluid in regard to the central hydraulic unit 26.

FIG. 8 shows the hydraulic valve system in a location in which the boom support is moving in a counterclockwise direction and has almost reached the full left position. The valve control 16 is adjusted so that the valve 61 moves fluid through the line 66 toward and into the cylinder end of the right hydraulic cylinder 28 and the ram end of the left hydraulic unit 27. The valve 61, when in this position, causes fluid to move from the rod end of the right hydraulic unit 28 and the cylinder end of the left hydraulic unit 27. Consequently the right hydraulic unit 28 is extending and the left hydraulic unit 27 is retracting. The cam follower 54 is on the high side 48 of the cam plate 46 and consequently fluid lines 63, 68 are interconnected and fluid lines 64, 67 are interconnected. This causes fluid to move into the ram end of the central hydraulic unit 26 and out of the cylinder end of the unit 26. Consequently the hydraulic unit 26 will also be retracting. Upon reaching the extreme left transverse position, the next movement of the valve control lever 16 is to the position shown in FIG. 6. Such a movement of the lever causes the fluid to move in the lines 65, 66 in reverse order and consequently the movement through the valve 62 will also be reversed to cause the cylinder 26 to begin to extend. Consequently movement of the control lever 16 automatically reverses the flow of fluid in the valve 62 and to the lines 67, 68.

Provided in the lines 67, 68 between the valve 62 and the central hydraulic unit 26 is a pair of one-way restricter valves 70, 71 respectively. The purpose of the valves 70, 71 is to slow down or brake movement of the boom as it approaches a transversely extending position. As the ram of the central hydraulic unit 26 is retracted the valves 70, 71 are in their fluid restricting positions. As the ram is extended the valves 70, 71 do not restrict the passage of fluid and the ram moves at a comparatively high rate. The restricter valves 70, 71, when operating in combination with the hydraulic units 27, 28, that have their minimum effective lever arms at the outer transverse positions of the boom, cause the boom to slow down as it approaches either of the outer positions.

While only one form of the invention has been shown, it should be recognized that other forms and variations will occur to those skilled in the art. Therefore, while the preferred form was shown for the purpose of concisely and completely illustrating the principles of the invention, it should be understood that there is no intention to limit or narrow the invention beyond the broad concepts set forth in the appended claims.

What is claimed is:

1. On a swivel connection having an upright axis between a main support and a secondary support, the combination therewith of at least three angularly spaced pivotal connections on the secondary support radially spaced from the axis with two outer connections being on opposite sides of the upright axis and on opposite sides of the third pivotal connection; extensible and retractable hydraulic units carried at one of their ends on the main support and connected at their other ends to the respective pivotal connections with each of the hydraulic units being capable of angularly moving the boom support toward and away from a position in which the radius between the respective pivotal connection and upright axis is close to alignment with the axis of the respective hydraulic unit and the effective lever arm on the respective radius is reduced as it approaches alignment and is enlarged as it regresses from alignment, and whereby the pivotal connections are so disposed in relation to their respective hydraulic units that the effective lever arms of the two pivotal connections in relation to their respective hydraulic units increase and decrease substantially in unison and in reverse order to the effective lever arm of the third pivotal connection in respect to its hydraulic unit.

2. The structure as set forth in claim 1 characterized by the hydraulic units being connected to the main support at three transversely spaced locations with two outer hydraulic units extending from the respective transverse outer locations to the said two pivotal connections and a third hydraulic unit extending from the intermediate location to the aforesaid third pivotal connection.

3. The structure as set forth in claim 2 in which the secondary support carries a vertically movable boom and the intermediate location is in fore-and-aft alignment with the upright axis, and the third pivotal connection is behind the boom whereby the boom, third pivotal connection, upright axis, and third hydraulic unit may be aligned fore and aft.

4. The structure as set forth in claim 3 characterized by the effective lever arms between the upright axis and the outer pivotal connections being close to their maximum length as the boom is proximate to fore-and-aft alignment with the axis.

5. The structure as set forth in claim 1 characterized by the hydraulic units being adapted to swing the secondary structure between fore-and-aft and transversely extending positions and whereby part of the hydraulic units will be substantially aligned with the upright axis when the secondary structure is in the fore-and-aft position and is offset to one side of the upright axis when the secondary structure is in a transversely extending position, and another part of the hydraulic units is offset from the upright axis when the secondary structure is fore and aft and is close to alignment with the upright axis when the secondary structure is in a transversely extending position.

6. The structure as set forth in claim 5 further characterized by valve means for controlling the hydraulic units and valve control mechanism on the secondary support responsive to angular movement of the secondary support to automatically adjust at least part of the valve control mechanism.

7. The structure as set forth in claim 1 in which the secondary support carries a vertically movable boom and one of the hydraulic units is connected to the main support to extend in a line fore and aft of the upright axis and is connected to the third pivotal connection, and the third pivotal connection is on a line fore and aft of the upright axis when the boom extends in a fore-and-aft direction; and further characterized by a valve control for the latter hydraulic unit carried on the secondary support that is adapted to automatically reverse extension and retraction of the unit as the boom swings from one side of the fore-and-aft center line to the other side.

8. The structure as set forth in claim 7 in which the hydraulic units include a pair of outer hydraulic units connected to the respective outer connections and disposed on opposite sides of said one of the units and are connected to the main frame at locations transversely offset of the fore-and-aft line.

9. The structure as set forth in claim 8 further characterized by a manual valve control for extending and retracting the outer hydraulic units and the valve control for the said one hydraulic unit is in part a valve operating member on the main support, and a valve control member supported on the secondary support operatively engageable with the valve operating member and adapted to automatically change its hydraulic unit between extension and retraction as the outer units swing the boom past the fore-and-aft center line.

10. The structure as set forth in claim 9 further characterized by the manual control being operative to reverse the action of the hydraulic unit between the outer hydraulic units in response to reversing the action of the outer units.

11. The structure as set forth in claim 10 further characterized by restricter valve means between the valve control for said one of the hydraulic units and the hydraulic unit whereby the rate of movement of the boom about the upright axis is reduced as it moves proximate a transverse position in respect to the fore-and-aft center line.

12. On a boom-type implement having a main support and a boom support interconnected for relative movement about an upright axis, the improvement residing in: at least three angularly spaced pivotal connections radially spaced from the axis with two outer connections being on opposite sides of the upright axis and on opposite sides of the third pivotal connection; extensible and retractable hydraulic units carried at one of their ends on the main support and connected at their other ends to the respective pivotal connections with each of the hydraulic units being capable of angularly moving the boom support toward and away from a position in which the radius between the respective pivotal connection and upright axis is close to alignment with the axis of the respective hydraulic unit and the effective lever arm on the respective radius is reduced as it approaches alignment and is enlarged as it regresses from alignment, and whereby the pivotal connections are so disposed in relation to their respective hydraulic units that the effective lever arms of the two pivotal connections in relation to their respective hydraulic units increase and decrease substantially in unison and in reverse order to the effective lever arm of the third pivotal connection in respect to its hydraulic unit.

References Cited

UNITED STATES PATENTS

| 2,768,759 | 10/1956 | Holopainen | 214—138 |
| 3,047,171 | 7/1962 | Long | 214—138 |

HUGO O. SCHULZ, *Primary Examiner.*